(12) United States Patent
Burriss et al.

(10) Patent No.: US 7,334,096 B1
(45) Date of Patent: *Feb. 19, 2008

(54) ARCHITECTURE AND APPARATUS FOR ATOMIC MULTI-VOLUME OPERATIONS

(75) Inventors: Michael L. Burriss, Raleigh, NC (US); Michael P. Wagner, Raleigh, NC (US); Alan L. Taylor, Cary, NC (US); William P. Hotle, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 333 days.

This patent is subject to a terminal disclaimer.

(21) Appl. No.: 11/095,886

(22) Filed: Mar. 31, 2005

(51) Int. Cl.
*G06F 12/00* (2006.01)

(52) U.S. Cl. ..................................... 711/161; 711/162
(58) Field of Classification Search .................. 711/162
See application file for complete search history.

*Primary Examiner*—Reginald Bragdon
*Assistant Examiner*—Aracelis Ruiz
(74) *Attorney, Agent, or Firm*—Krishnendu Gupta; Robert Kevin Perkins

(57) ABSTRACT

An architecture and apparatus for atomic operations across multi-volume or multi-LUNs in a data storage environment. It is difficult to manage data storage and replication operations occurring across such multi-LUNs. The architecture and apparatus embodiments of the invention overcome these deficiencies and facilitate data storage management and replication operations through library initializations in response to host I/O requests to complete atomic operations. Accordingly, the invention ensures the integrity of the data being managed without introducing significant cost or overhead.

21 Claims, 14 Drawing Sheets

ARCHITECTURE AND APPARATUS FOR ATOMIC MULTI-VOLUME OPERATIONS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to data storage operations in a multi-volume or multi-LUN environment and more specifically to a method and system for atomic operations in such a multi-LUN environment

RELATED CASES

This application is related to co-pending U.S. patent application Ser. No. 11/095,885 entitled "System And Method For Atomic Multi-Volume Operations" by Burriss, et al filed on even date with this application, and is assigned to EMC Corporation, the same assignee as this invention.

BACKGROUND OF THE INVENTION

Computer systems may include different resources used by one or more host processors. Resources and host processors in a computer system may be interconnected by one or more communication connections. These resources may include, for example, data storage systems, such as the Symmetrix™ or Clariion™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units neither may or may nor correspond to the actual disk drives. Allowing multiple host systems to access the single storage device unit allows the host systems to share data stored therein.

It is desirable to copy or replicate data for a variety of different reasons, such as, for example, database-related data may be critical to a business so it is important to make sure is not lost due to problems with the computer systems, such as for example, loss of electrical power. However, there are costs associated with backing up or otherwise copying or replicating data. Such costs include the data being unavailable to an application that may require access to it. For example, in a normal business operation, not as a production environment, data may be needed for an update or in relation to a transaction on a close to full-time (i.e., 24 hours a day, 7 days a week) basis.

To provide for data security, replicas or copies of production data are often transferred out of the production environment into a replica environment including a replica storage system. Multiple volumes, sometimes referred to as multi-volume or multi-logical unit, also known as multi-LUN are often involved, and it is difficult to manage data storage and replication operations occurring across such multi-LUNs. It would be an advancement in the art to be able to manage such operations in a fashion that ensures the integrity of the data being managed without introducing significant cost or overhead.

SUMMARY OF THE INVENTION

To overcome the problems and provide the advantages that have been described above, the present invention in one embodiment is an architecture including program logic for performing atomic multi-volume or multi-LUN operations in a data storage environment.

In another embodiment an apparatus perform steps for atomic multi-volume or multi-LUN operations in a data storage environment.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

Figure 1:
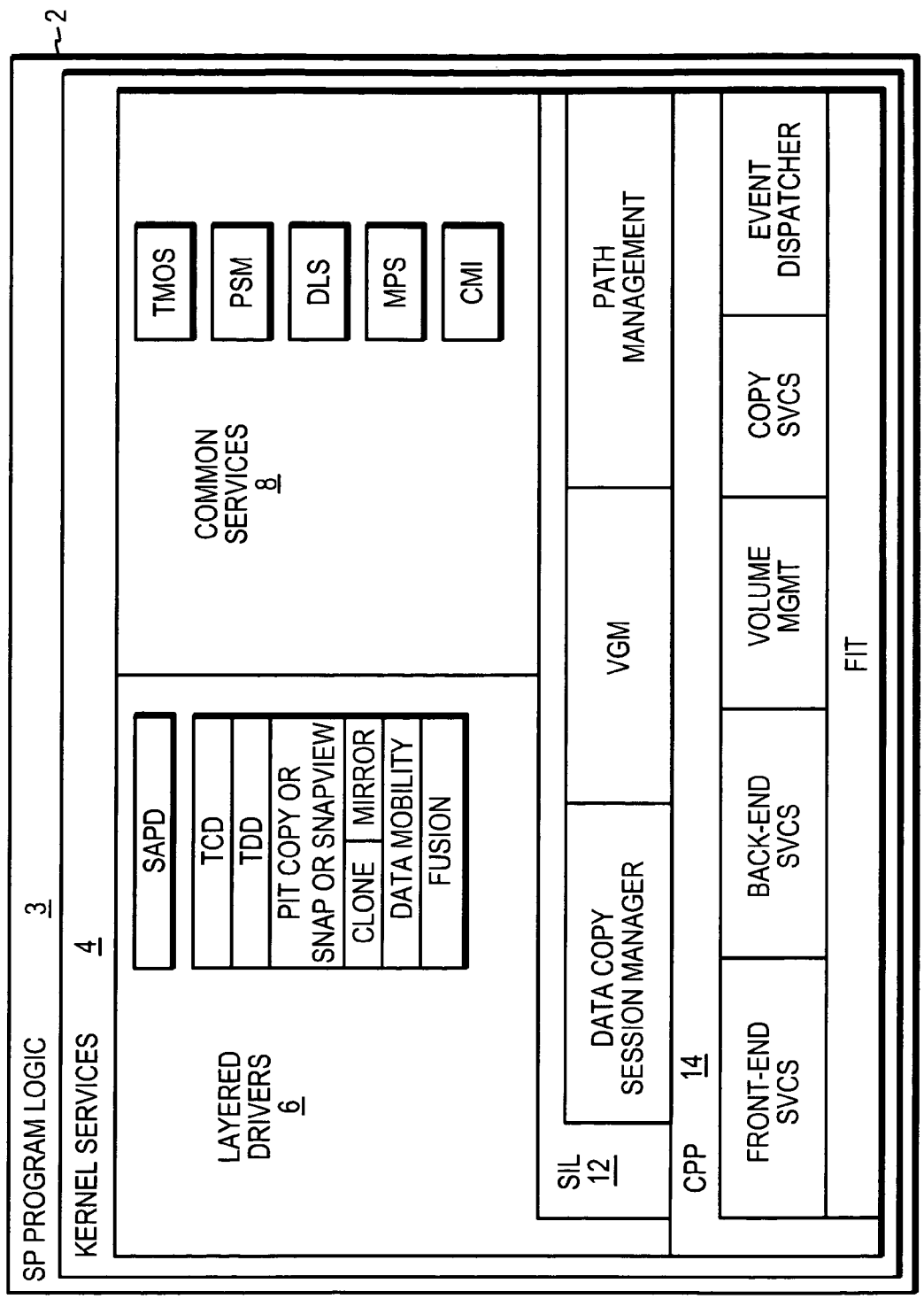
FIG. 1 is a functional block diagram of an architecture embodiment including software components of a storage processor that is part of a data storage system, the architecture including Program Logic for carrying out methodology embodiments of the invention.

The methods and apparatus of the present invention are intended for use in Storage Area Networks (SAN's) and Network Attached Storage (NAS) networks that include data storage systems, such as the Symmetrix Integrated Cache Disk Array system or the Clariion Disk Array system available from EMC Corporation of Hopkinton, Mass. and those provided by vendors other than EMC.

Generally such a data storage system includes a system memory and sets or pluralities and of multiple data storage devices or data stores. The system memory can comprise a buffer or cache memory; the storage devices in the pluralities and can comprise disk storage devices, optical storage devices and the like. However, in a preferred embodiment the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to the preferred data storage system, the host or host network is sometimes referred to as the front end and from the disk adapters toward the disks is sometimes referred to as the back end. A logical concept called a data storage volume or a logical unit (LUN) acts as virtual disks that may be presented for access to one or more host computers for I/O operations. Regarding terminology a volume or LUN is used interchangeably as well as multi-volume and multi-LUN which both mean more than one of the virtual disks described above. A bus interconnects the system memory, and communications with front and back end. As will be described below, providing such a bus with switches provides discrete access to components of the system.

The methods and apparatus of this invention may take the form, at least partially, of program code (i.e., instructions) embodied in tangible media, such as floppy diskettes, CD-ROMs, hard drives, random access or read only-memory, or any other machine-readable storage medium, including transmission medium). When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below (FIGS. 1 and 14 show details of the Program Logic)).

Details of an Architecture Including Program Logic Having Software Components

Figure 14:
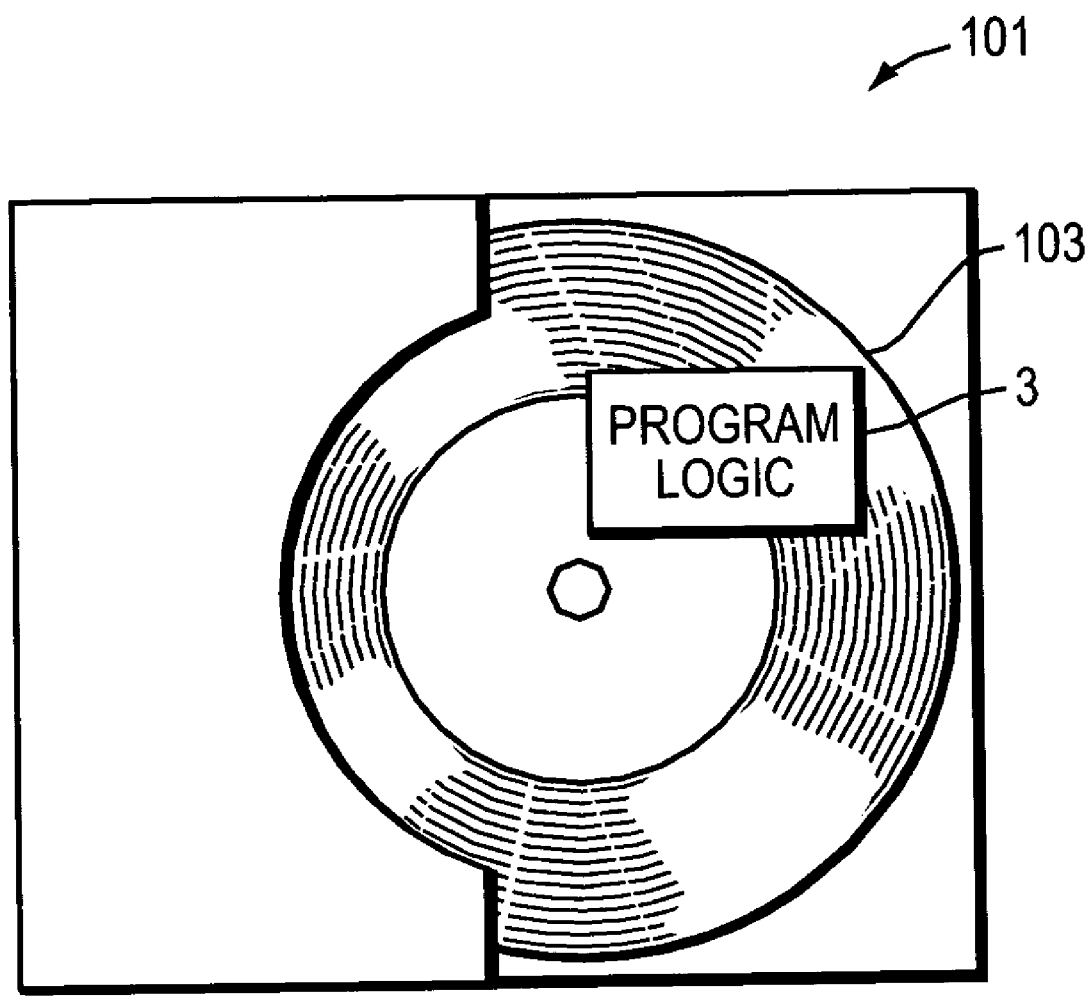
FIG. 14 is a computer program product including a computer-readable medium encoded with program logic capable of executing methodology described herein.

Reference is made to FIGS. 1 and 14, below. Referring to FIG. 1, Storage Processor (SP) 2 is shown for the sake of simplicity individually; however, in the preferred environment the SP is one of at least 2 SP's disposed as part of a data storage system, such as the preferred Clariion data storage system. The Storage Processor includes SP Program Logic 3 that is software in a preferred embodiment and includes components shown in FIG. 1 and now described.

Reference is now made to FIGS. 14 and 1. A Program Product 101 (FIG. 14) is formed when Program Logic 3 is encoded on computer-readable medium 103 (FIG. 14) enabling a computer to execute the Logic and perform computer-executed steps for carrying out some or all of the methodology described herein. Referring again to FIG. 1, Program Logic 3 includes Kernel Services 4. The Kernel Services include Layered Drivers 6, Common Services 8, Switch-Independent Layer (SIL) 12, and Control Path Processor (CPP) 14.

The CPP 14 provides Front-End Services (FRONT-END SVCS) that include creating and destroying virtual targets, activate and deactivate virtual targets. Activation causes the target to log into the network while deactivation causes it to log out. Storage Presentation objects represent the presentation of a volume on a particular target. These Front-End Services also include LUN mapping and/or masking on a per initiator and per target basis. The CPP provides Back-End Services (BACK-END SVCS) that include discovering back-end paths and support for storage devices or elements, including creating and destroying objects representing such devices or elements. Back-End Services include managing paths to the devices and SCSI, Fibre Channel, or iSCSI command support. These services are used by the Layered Drivers 6 to discover the back-end devices and make them available for use, and by the Path Management of the Storage Independent Layer (SIL). The SIL is a collection of higher-level services including managing connectivity to storage devices. These services are implemented using the lower-level services provided by the CPP.

CPP 14 provides a volume management (Volume MGMT) service interface that supports creating and destroying virtual volumes, associating virtual volumes with back-end Storage Elements, and composing virtual volumes for the purpose of aggregation, striping, mirroring, and/or slicing. The volume management service interface also can be used for loading all or part of the translation map for a volume to a virtualizer, quiescing and resuming IO to a virtual volume, creating and destroying permission maps for a volume, and handling map cache miss faults, permission map faults, and other back-end errors. These services are used by the volume graph manager (VGM) in each SP to maintain the mapping from the virtual targets presented out of the logical front of the instance to the Storage Elements on the back-end.

There are other CPP modules. The SAL copy service (COPY SVCS) functions provide the ability to copy blocks of data from one virtual volume to another. The Event Dispatcher is responsible for delivering events produced from the IMPS to the registered kernel-based services such as Path Management, VGM, Switch Manager, etc.

The SIL 12 is a collection of higher-level services. These services are implemented using the lower-level services provided by the CPP. These services include:

Volume Graph Manager (VGM)—The volume graph manager is responsible for processing map-miss faults, permission map faults, and back-end IO errors that it receives from the CPP. The VGM maintains volume graphs that provide the complete mapping of the data areas of front-end virtual volumes to the data areas of back-end volumes. The VGM provides its service via a kernel Dynamic Linked Library (DLL) running within the SP.

Data Copy Session Manager—The Data Copy Session Manager provides high-level copy services to its clients. Using this service, clients can create sessions to control the copying of data from one virtual volume to another. The service allows its clients to control the amount of data copied in a transaction, the amount of time between transactions, sessions can be suspended, resumed, and aborted. This service builds on top of capabilities provided by the CPP's Data Copy Services. The Data Copy Session Manager provides its service as a kernel level DLL running within the SP.

Path Management—The path management component of the SIL is a kernel-level DLL that works in conjunction with the Path Manager. Its primary responsibility is to provide the Path Manager with access to the path management capabilities of the CPP. It registers for path change events with the CPP and delivers these events to the Path Manager running in user-mode.

The CPP also hosts a collection of Common Services 8 that are used by the layered application drivers. These services include:

Persistent Storage Mechanism (PSM)—This service provides a reliable persistent data storage abstraction. It is used by the layered applications for storing their meta-data. The PSM uses storage volumes that are located on the Disk Array Enclosure attached to the CPP. This storage is accessible to both SPs, and provides the persistency required to perform recovery actions for failures that occur. These volumes may be held not visible to external hosts and used for internal management.

Distributed Lock Service (DLS)—This service provides a distributed lock abstraction to clients running on the SPs. The service allows clients running on either SP to acquire and release shared locks and ensures that at most one client has ownership of a given lock at a time. Clients use this abstraction to ensure exclusive access to shared resources such as meta-data regions managed by the PSM.

Message Passing Service (MPS)—This service provides two-way communication sessions, called filaments, to clients running on the SPs. The service is built on top of the CMI service and adds dynamic session creation to the capabilities provided by CMI. MPS provides communication support to kernel-mode drivers as well as user-level applications.

Communication Manager Interface (CMI)—CMI provides a simple two-way message passing transport to its clients. CMI manages multiple communication paths between the SPs and masks communication failures on these. The CMI transport is built on top of the SCSI protocol which runs over 2 Gbps Fibre-Channel links that connect the SPs via the mid-plane of the storage processor enclosure.

The CPP includes Layered Drivers 6 providing functionality as described below for drivers denominated as Fusion, Clone/Mirror, PIT Copy (also referred to as Snap or Snap-View), TDD, TCD, and SAPD.

The Fusion layered driver provides support for re-striping data across volumes. For striping, the Fusion layer (also known as the Aggregate layer), allows the storage administrator to identify a collection of volumes (identified by LUN) over which data for a new volume is striped. The number of volumes identified by the administrator determines the number of columns in the stripe set. Fusion then creates a new virtual volume that encapsulates the lower layer stripe set and presents a single volume to the layers above.

Fusion's support for volume concatenation works in a similar way; the administrator identifies a collection of volumes to concatenate together to form a larger volume. The new larger volume aggregates these lower layer volumes together and presents a single volume to the layers above. The Fusion layer supports the creation of many such striped and concatenated volumes.

The Clone driver provides the ability to clone volumes by synchronizing the data in a source volume with one or more clone volumes. Once the data is consistent between the source and a clone, the clone is kept up-to-date with the changes made to the source by using mirroring capabilities using storage from the back-end.

The Mirror driver supports a similar function to the clone driver however, mirrors are replicated. This provides the ability to replicate a source volume on a remote instance and keep the mirror volume in synch with the source.

The PIT (Point-In-Time) Copy driver, also known as Snap, or SnapView, provides the ability to create a snapshot of a volume. The snapshot logically preserves the contents of the source volume at the time the snapshot is taken. Snapshots are useful for supporting non-intrusive data backups, replicas for testing, checkpoints of a volume, and other similar uses.

The Target Class Driver and Target Disk Driver (TCD/TDD) layer provides SCSI Target support. The TCD/TDD Layer also implements support for the preferred Clariion functionality which provides the means of identifying what LUNs each initiator should see. This is known as LUN masking. The feature also provides for LUN mapping whereby the host visible LUN is translated to an instance-based LUN. Additionally such functionality when combined with a host agent provides the ability to identify which initiators belong to a host to simplify the provisioning of LUN masking and mapping.

The Switch Adapter Port Driver (SAPD) is presented as a Fibre-Channel Port Driver to the TCD/TDD (Target Class Driver/Target Disk Driver) drivers, but rather than interfacing with a physical port device on the SP, the driver interfaces with the CPP and creates a device object for each front-end port.

The Path Management is responsible for the construction and management of paths to back-end Storage Elements and is part of Kernel-mode services. It notes when paths change state; based on these state changes it applies its path management policies to take any adjusting actions. For example, upon receiving a path failure notification, the Path Management might activate a new path to continue the level of service provided for a back-end volume.

Reference is made again to FIG. 1, which shows two features that work together: the SnapView Driver of Layered Drivers 6 and Transactional Multi-step Operation Support (TMOS) Library of Common Services 8. SnapView is a layered driver like Clones and Mirror where TMOS is a common services library like PSM. Combination of the SnapView driver with the TMOS library allows for atomicity of a multi-volume or multi-LUN operation during replication operations. The SnapView multi-LUN operation component is a lower level component that interacts with functions provided by the TMOS library, including a state machine in the design. What the multi-LUN feature gives is the ability to perform an atomic like operation across Storage Processors without regard to ownership of the LUN. The multi-LUN operation is designed to handle what are known as consistent and non-consistent operations. Atomicity and functions made possible through the library allows consistency requirements to be met across a set of devices or LUNs (configured into a group by the user) across SPs. With TMOS and SnapView working together, functions that the Snapview driver or other replica driver performs occur atomically across a set of LUNs. These operations can be coordinated across one or more Storage Processors across one or more arrays.

Figure 2:
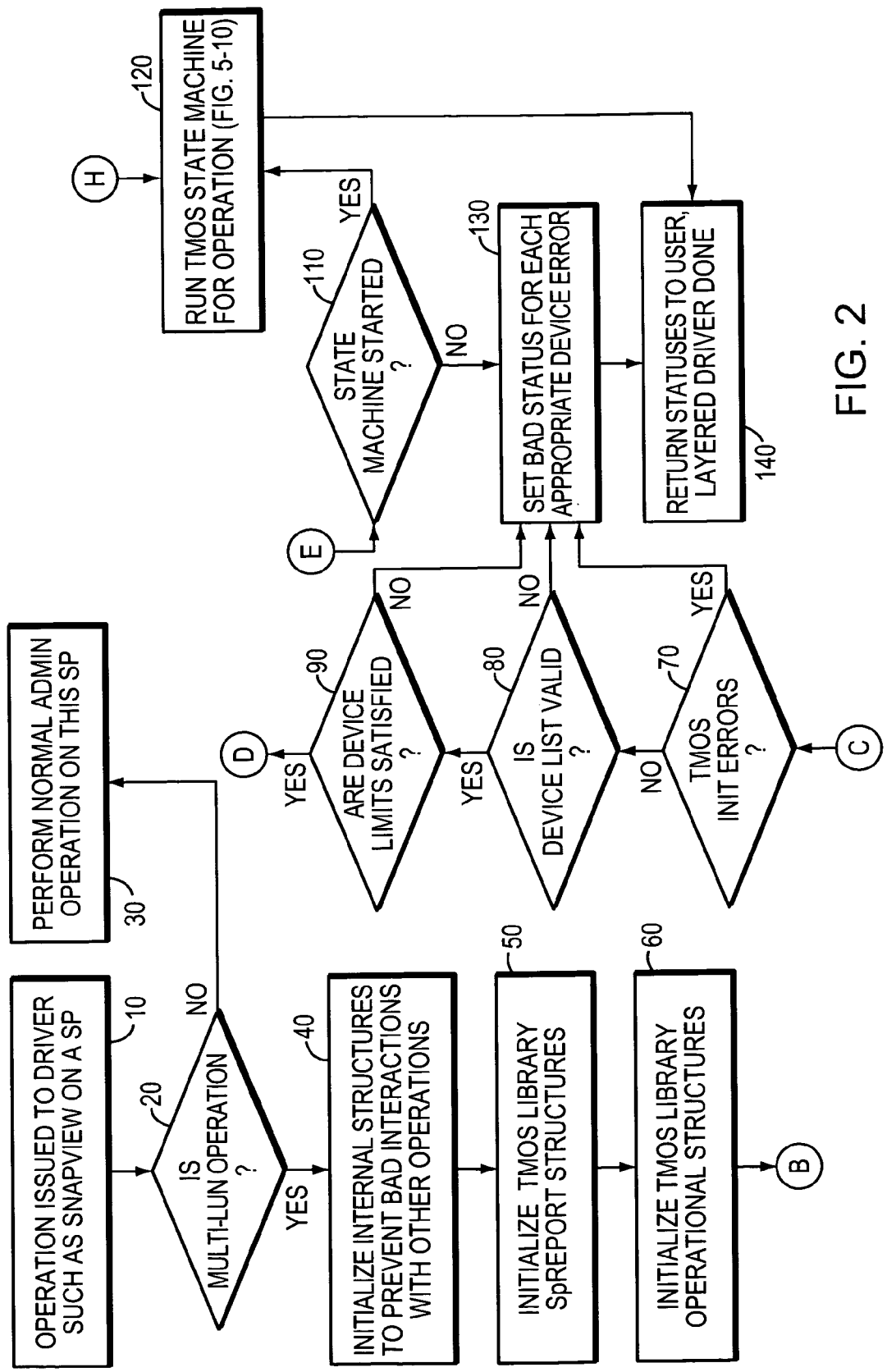
FIG. 2 is a flow logic diagram showing method steps for carrying out a methodology embodiment of the invention enabled by the Program Logic and the architecture of FIG. 1.

In FIG. 2, wherein high level operation of a layer driver with the TMOS library functions is shown. Preferably the layered driver is SnapView or other type of replica driver. When an operation is issued to the preferred SnapView on an SP in Step 10, it is followed by a query in Step 20 to determine if this is a multi-LUN operation. If not, then in Step 30, a normal admin operation is performed and multi-LUN processing for SnapView ends. But if it is a multi-LUN operation then it needs to run on both SPs, then the next Step is 40. The SP that receives the initial operation command is considered the Initiating SP. All other SPs are considered Participating SPs.

Step 40 is the initialization of the persistent information that is needed for the layered driver to set the initial state of the operation being performed. This includes any inter-SP structures and state that are required to be configured so that other operations (multi-LUN or non-multi-LUN) do not interfere with the command being executed. This could result is these overlapping operations failing or pending. Step 50 initializes the TMOS SPReport structures. This step initiates non-persistent TMOS information; namely the SPReport packets that each SP must maintain on its own. The Initiating SP is the only SP that maintains a copy of every participating SP's report information. The SPReport contains information such as the status of the multi-LUN operation on the SP. Step 60 initializes TMOS persistent operational data structures (also called docket entries). This contains all of the information that has to survive reboots and panics. This information is stored in the PSM. Processing now flows to connecting Step B (to FIG. 3).

Referring again to FIG. 2, in Step 70, if the TMOS fails to initialize correctly, then appropriate errors are set in Step 130 and return status is set in Step 140. If there are no errors, then processing continues to the next check at Step 80. The question here is the start of some basic validation for the layered driver that is done upfront to avoid running a state machine that would fail. If the device list is not valid in Step 80, then appropriate errors are set in Step 130 and return status is set in Step 140. If they are valid, then processing continues to the next check at Step 90. In Step 90, the question here asks are the limits satisfied for the operation being performed and for the devices being used. If not, then appropriate errors are set in Step 130 and return status is set in Step 140. If they are satisfied then proceed to connecting Step D that flows into FIG. 4.

Figure 3:
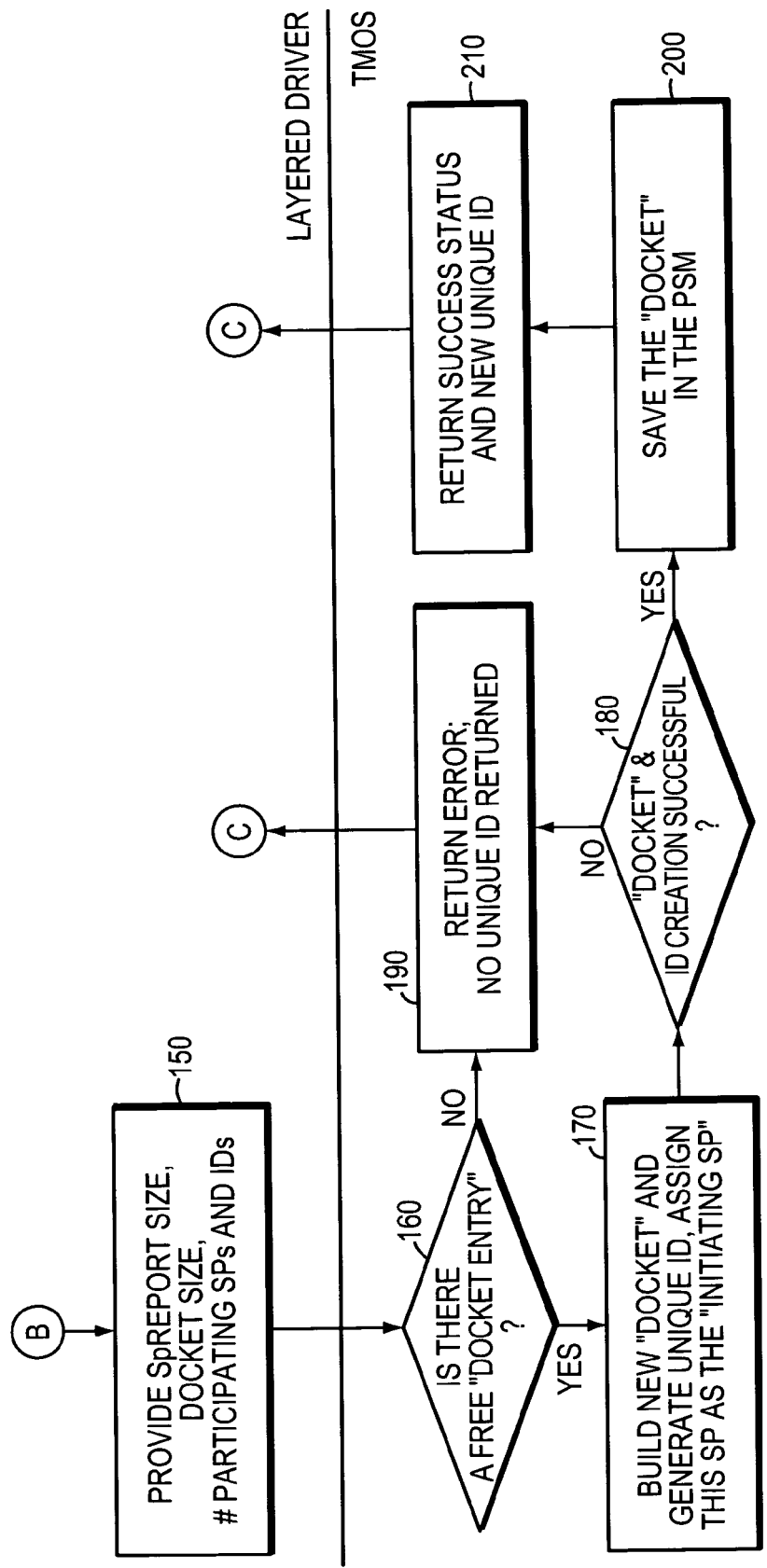
FIG. 3 is another flow logic diagram showing method steps for carrying out a methodology embodiment of the invention enabled by the Program Logic and the architecture of FIG. 1.
Figure 4:
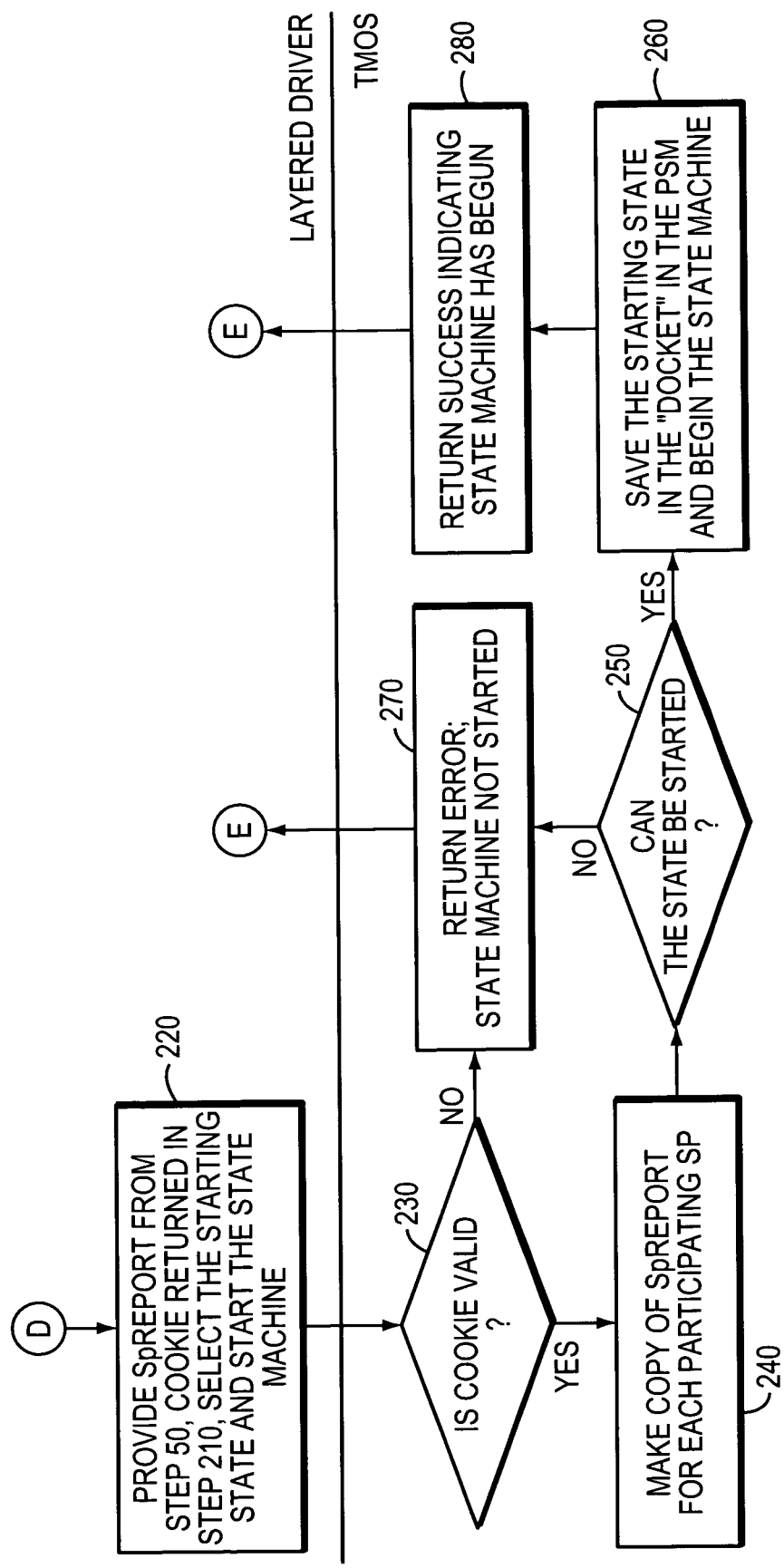
FIG. 4 is another flow logic diagram showing method steps for carrying out a methodology embodiment of the invention enabled by the Program Logic and the architecture of FIG. 1.

Referring to FIG. 4, Step 220 is where layered drivers, such as SnapView and Clones, begin using the TMOS state machine to start the multi-LUN operation. This begins back-and-forth operations between the TMOS library and the layered driver executing the high level TMOS states and any internal states that may need to be run by the layered driver. Processing flows to Step 230 to determine if the cookie returned in Step 210 (FIG. 3, discussed below) is valid. If not, an error is returned in Step 270 and the state machine is not started. Processing flows to connecting Step E and back to FIG. 2.

Referring again to FIG. 2, Step 110 asks if the state machine is started and if not, then appropriate errors are set in Step 130 and return status is set in Step 140. If Yes, then the TMOS state machine is run for operation in Step 120 and processing flows back to Step 140 for a return status set. Step 120 represent all of the states for any multi-LUN operations and these will be referenced in later FIGS. 5-10. Step 140 is the last exit point for layered drivers. The status codes (good or bad) have to be returned to the user, which could be a real user or another layered application above Snap in the driver stack). Multi-LUN operations return 2 classes of status codes: overall status codes and individual status codes. After the status is returned to the user, the layered driver code returns back to the TMOS state machine so that it can exit cleanly for the next operation to run.

Overall error codes are used to define the overall error result for the entire operation. This overall error code is also use to define the recovery state of the operation that just failed. If the operation succeeds as a whole, then all of the status codes for the devices themselves will be a success. If the operation fails, then the user must check each and every device status code for what caused the failure. At least one device will have a cause. For multi-LUN operations, all of the devices have to succeed for a given operation or the operation fails. This is an aspect of atomicity. The other status codes are status codes for the individual devices that failed. Not all devices will have failure codes. Some will have success; others will have not-attempted, while the remaining will have errors. Success means that the operation, had it succeeded at all, most likely would have succeeded on this device. Not-attempted is used to inform the user that neither success nor failure for this operation could be determined. Failure means the failure condition on this device that caused the overall operation to fail. Each failed device could have a different failure condition. Both sets of errors are what are returned to the user in Step 140. The user then decides the next course of action.

Referring to FIG. 3, following Step 60 (FIG. 2) processing is next to Step 150. In Step 150, the layered driver initialization code, e.g., SnapView and Clones layered drivers, initializes the non-persistent SPReport infrastructure. The SPReport is used to track information like statuses for all devices involved for the multi-LUN operation for a given Participating SP. The layered driver's specific piece of the TMOS docket that will be saved persistently by TMOS at the end of each completed state and all other relevant information for a given operation. Once this information is built and calculated, processing continues to the first TMOS interface call at Step 160.

In Step 160, the TMOS library code has to determine if there is room for a new operation because there could be an imposed limit. This limit could differ by each layered driver's implementation and use of the TMOS library. This step asks whether or not there is a free one. If not, an error is return back to the layered driver at step 190, which then flows to connecting Step C (to FIG. 2). If there is room for another operation to start on the array, the TMOS library builds its piece of the docket entry in Step 170, and passing through if successful at Step 180, it saves the entry and saves it in the PSM on the Initiating SP at Step 200. Then return success status and new unique identifier to the layered driver that requested the operation be created is done in Step 210. This flows to Connecting Step C, which flows back to Step 70 in FIG. 2. If not successful, at Step 180, an error is returned in Step 190.

Referring again to FIG. 4, generally describes operation once the TMOS state machine has started. The TMOS state machine is started once multi-LUN operation is detected, structures are created and saved for permanence, and the device list has been validated. To start the state machine within the TMOS library, it needs to be provided with a Unique Id (or Cookie) provided by the library from Step 210 (FIG. 3), the SPReport provided and initialized, and state given for beginning the state machine. In most cases, it is a good choice to start the TMOS library in the Start state, but that is not required. Step 220 is where the layered driver gathers all of the necessary information needed for the TMOS library to start. As stated before, in Step 230, the TMOS library checks that the Cookie is valid. If not, it returns an error in Step 270. If it is valid then it proceeds to Step 240. At Step 240, the TMOS library makes a copy of the SPReport information for all of the Participating SPs. It then forwards this information on to the other SPs so they can start the state machine as well. If this is successful, then in Step 250, the state machine can be started on all Participating SPs, then save the state in the PSM in Step 260 and proceed. If not, then return an error to the user that the state machine was not started at Step 270.

Referring again to FIG. 4, in Step 260, if the state machine has started with the given state from Step 220, then this information is saved persistently in the PSM and processing flows to Step 280. At the end of each state's completion, the current state information is always saved away by the TMOS library for recovery purposes. If the array(s) or SP(s) were to panic or otherwise reboot during the operation, the state of the state machine is preserved for the layered driver to take corrective action if needed. (This processing is discussed in reference to FIG. 13, where the boot code performs the recovery since it is the first instance for which a recovering array(s) and SP(s) notice that the state machine did not complete from the last time the system was up). Step 270 returns an error to the layered driver's start code for the operation. Step 280 returns success to the layered driver's start code for the operation. Either Step 270 or Step 280 leads to connecting Step E that in turn leads back to Step 110 in FIG. 2.

Figure 5:
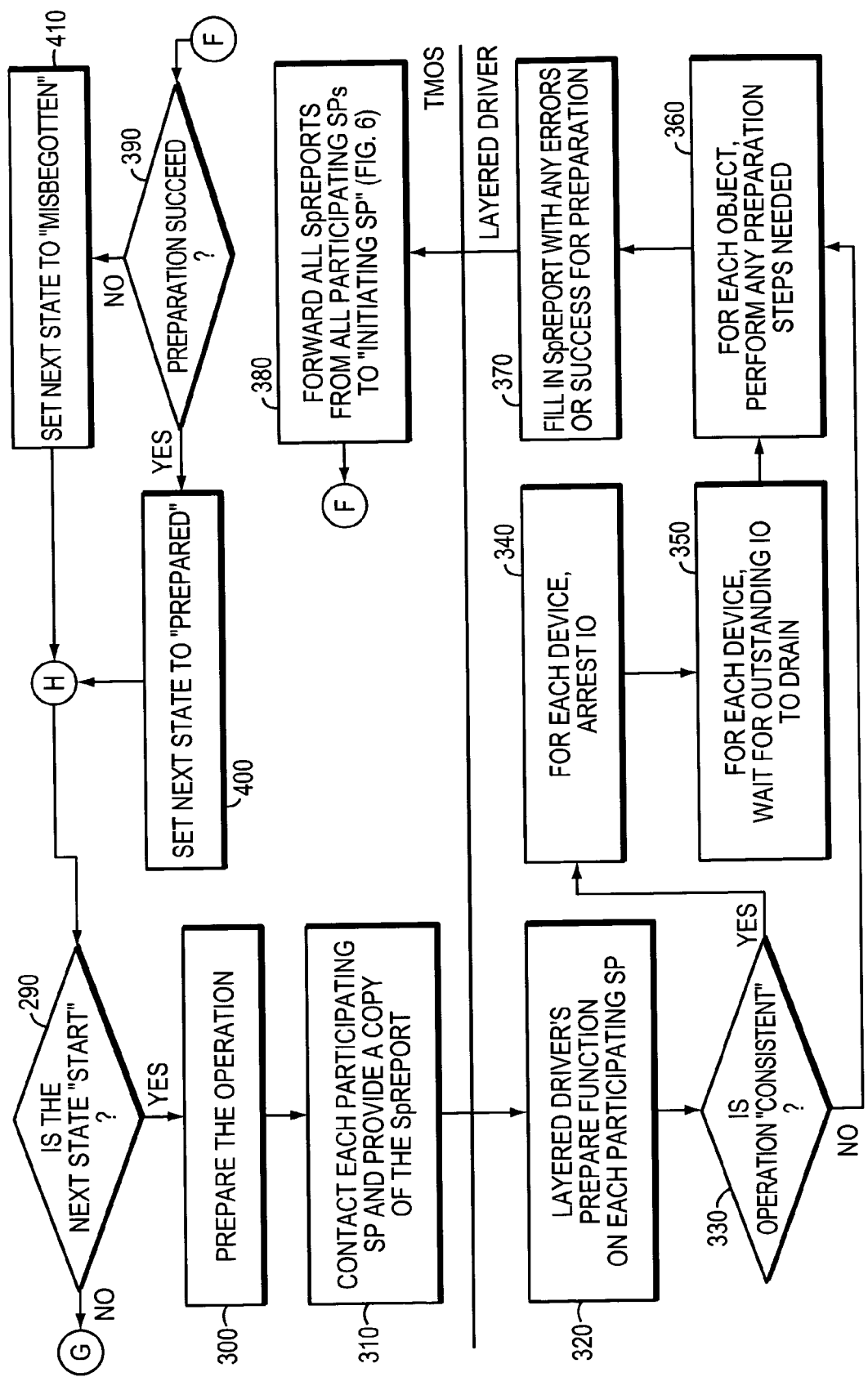
FIG. 5 is another flow logic diagram showing method steps for carrying out a methodology embodiment of the invention enabled by the Program Logic and the architecture of FIG. 1.

Referring to FIG. 5, generally these steps detail where the TMOS library's state machine begins regardless of the starting state provided in FIG. 4 Step 220. In step 290, the initial starting state is checked to see if it is set to the Start state. If so, processing flows to Step 300. If not, then processing flows to connecting Step G and then on to FIG. 7 for the next sets of states to determine. In Step 300, the Logic prepares the operation. This state is designed for the layered drivers running the Participating SPs (the Initiating SP may run as a Participating SP for certain specific SP tasks) to do any operations on their own that might be needed before proceeding to the Prepared TMOS state. In Step 310 Each Participating SP is contacted in this step and they all proceed to Step 320 and run the state independently of the other SPs.

In Step 320, the prepare function starts for the layered driver. In Step 330, a query asks if the operation is a consistent operation. This implies that the set of the devices within the operation is being performed in such a way that IO from the host needs to be quiesced on all of the devices in the operation before the operation can be performed against any of them. If the operation is consistent proceed to Step 340. If not, then proceed to Step 360.

In Step 340, the quiescing of IO is performed in 2 steps. The first step is the Arrest all IO on all of the devices involved. This effectively blocks any new host IO from being processed by the layered driver for a particular device. After all devices have Arrested proceed to Step 350, which is the second step in the quiescing process. Since the Logic has prevented any new IOs from being processed by the device, it waits on any existing IOs for this device to complete. This is called a Wait for Drain model. Once all of the IOs for all of the devices in the operation have drained the Logic proceeds to Step 360. Step 360 represents whatever preparation steps need to be done, if any, for the operation being performed. In Step 370, the SP running the prepare function stores its information (from its point-of-view only) in its SPReport on how its prepare function ran.

Referring again to FIG. 5, in Step 380, each TMOS library running on each Participating SP forwards all of the SPReports to the initiating SP. The Logic now proceeds to FIG. 6, through Connecting Step F, to determine if the operation succeeded for this state or not, but also on one path back to Step 390 of FIG. 5. In Steps 390, 400, and 410, if the preparation succeeds for the Participating SPs, then the Logic sets the next state to Prepared. In Step 400, the Logic proceeds back into the TMOS state machine for the next state. If the preparation failed for any of the devices on any of the Participating SPs, then the Logic sets the next state to Misbegotten at Step 410 and proceeds back into the TMOS state machine for the next state, and both Step 400 and 410 flow into connecting Step H.

Figure 6:
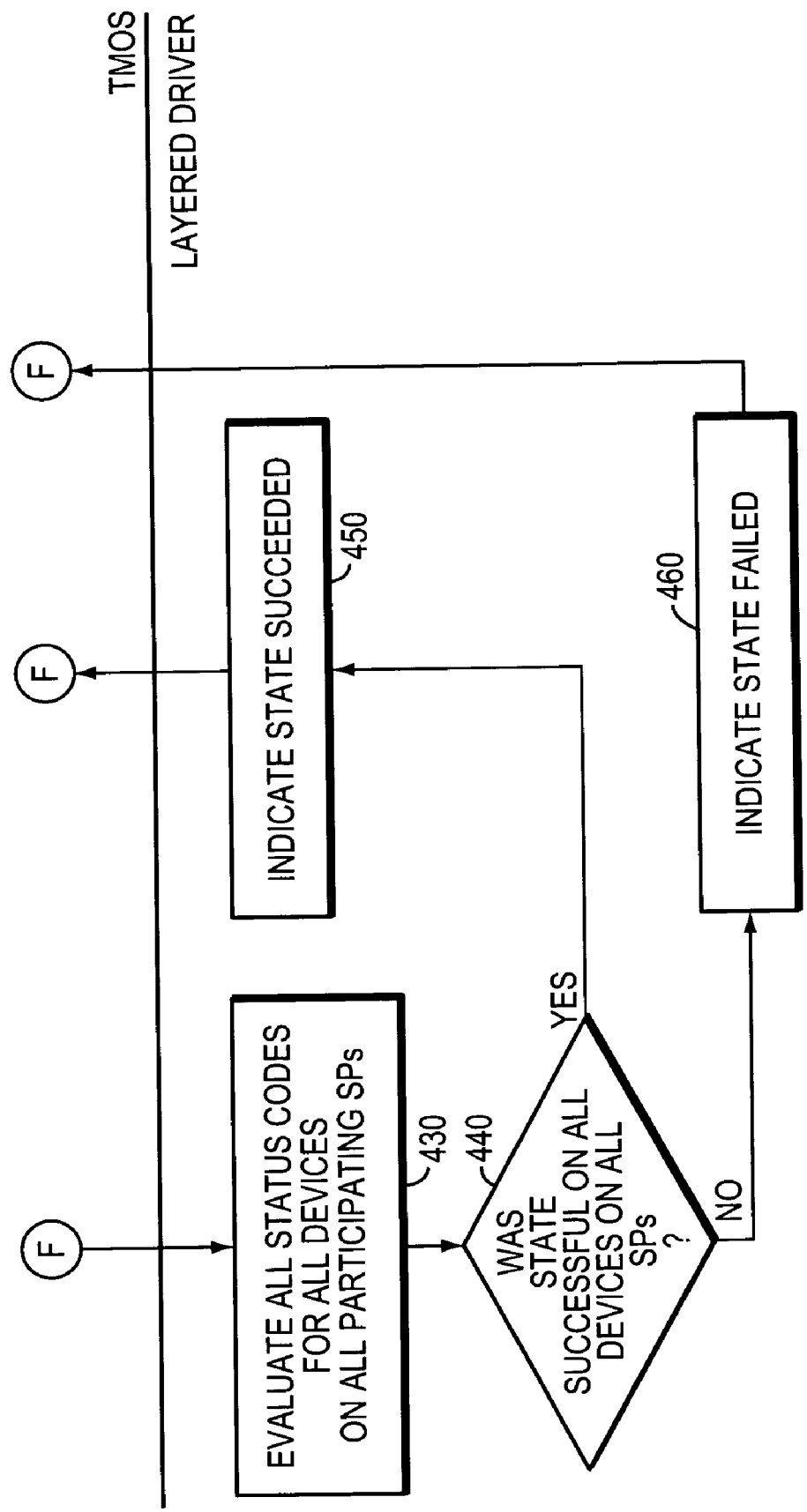
FIG. 6 is another flow logic diagram showing method steps for carrying out a methodology embodiment of the invention enabled by the Program Logic and the architecture of FIG. 1.

Referring to FIG. 6, this shows the determination of success or failure of a multi-LUN operation that each layered driver must perform at the end of each completed TMOS state. After each Participating SP's TMOS forwards its local SPReport information to the Initiating SP, the Initiating SP gathers them together and then hands them to the layered driver to determine if the state just completed actually succeeded or failed. Step 430 is an evaluation to determine success or failure. Each operation could have different criteria on success or failure. Step 440 asks about this success. If Yes, then Step 450 indicates that, or if NO then Step 460 indicates the failure. Either way processing flows into connecting Step F. In Step 450 and 460 the Logic can build a unified SPReport representing the statuses from all of the devices involved in the operation. This final SPReport can be used to determine the success or failure of a given state across all Participating SPs.

Figure 7:
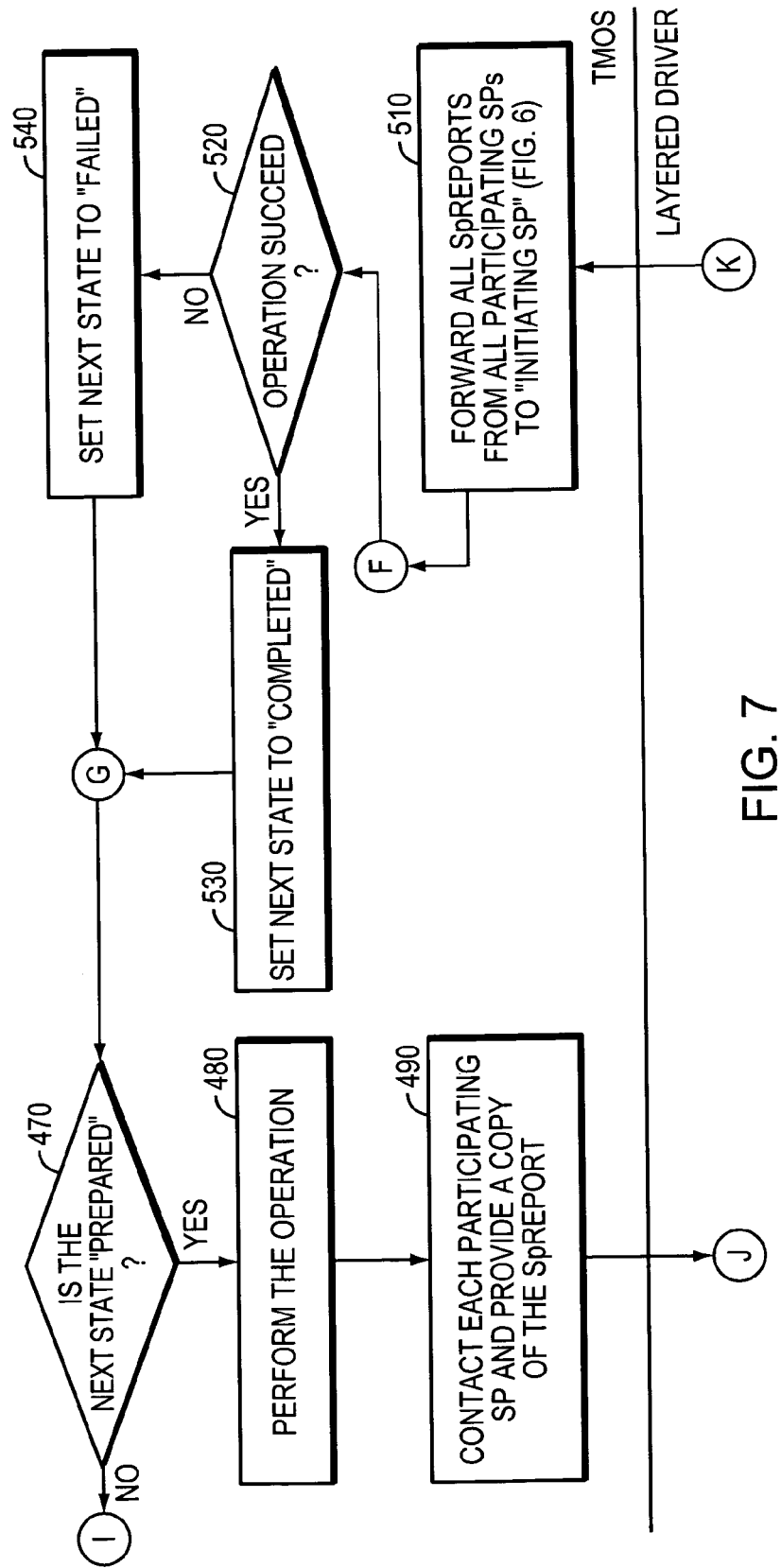
FIG. 7 is another flow logic diagram showing method steps for carrying out a methodology embodiment of the invention enabled by the Program Logic and the architecture of FIG. 1.

Referring to FIG. 7, this shows performing an operation after entering the Prepared state. In Steps 470 and 480, if the next state is Prepared then the Logic performs the operation in Step 480. If not, then processing flows to connecting Step I and then on to FIG. 9 for the next sets of states to determine. In Step 490, each Participating SP is contacted in this step and they all proceed to Step 560 (FIG. 8) via connecting Step J and run the state independently of the other SPs, and prepare a report. In Step 510, each TMOS library running on each Participating SP forwards all of the SPReports to the initiating SP, and then to continuation Step F. In Step 520 and 530, if the steps to perform the operation succeed for Participating SPs, then the Logic sets the next state to Completed in Step 530 and proceed back into the TMOS state machine for the next state through connecting Step G. If the steps to perform the operation failed for any of the devices on any of the Participating SPs, then the Logic sets the next state to Failed in Step 540 and proceeds back into the TMOS state machine for the next state, also through connecting Step G.

Figure 8:
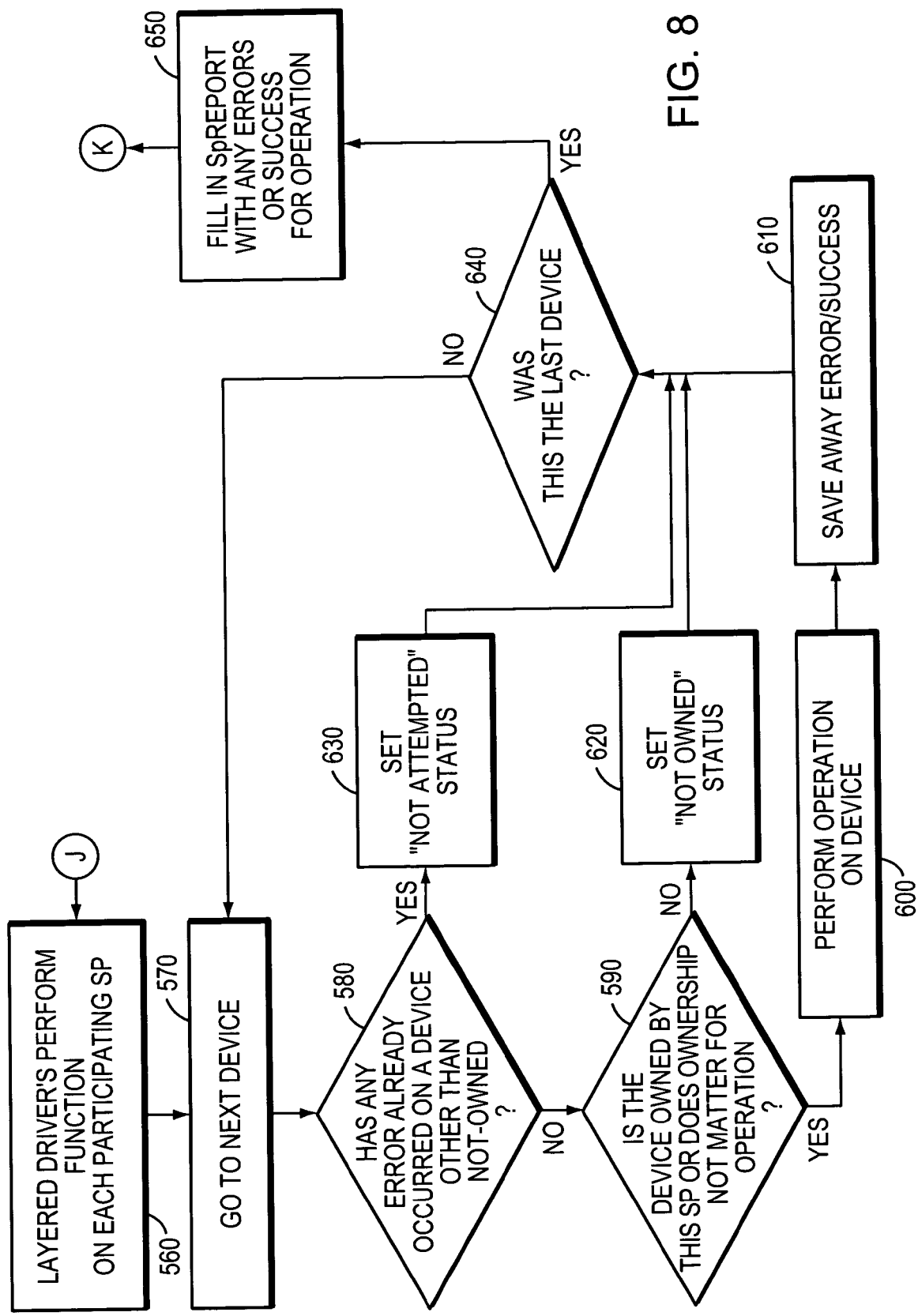
FIG. 8 is another flow logic diagram showing method steps for carrying out a methodology embodiment of the invention enabled by the Program Logic and the architecture of FIG. 1.

Referring to FIG. 8, this shows the layered driver steps during the TMOS Prepared state to perform the operation itself. In Step 560, the layered driver performs the multi-LUN operation on each Participating SP. The Logic proceeds to Step 570 to process another layered device once one has been performed. In Step 580, a check is made for any errors that may have occurred thus far. If so, then this device is not attempted and a status of Not Attempted is saved away for this device at Step 630. If no error has occurred thus far, Step 590 is processed next. In Step 590 the question is asked whether the device is owned by the Participating SP or if the ownership of the device not matter for this operation. If either are YES, then the Logic proceeds with performing the operation requested on the device in Step 600, and saving the status in Step 610. If both are no, then the Logic sets the status to Not Owned for this device In Step 620. In Step 630, the Logic sets the Not Owned status. In Step 640, this operation checks for the last device. If done, then the Logic continues back to Step 570. If the Logic is done, it proceeds to Step 650, and onto continuation Step K. In Step 650, the SP running the perform function stores its information (from its point-of-view only) in the SPReport describing how its perform function ran.

In the preferred embodiment, the SPs have a concept of ownership, particularly when part of the preferred EMC's Clariion data storage system. This is where only one SP can perform an operation or IO against a particular LUN in the array. There are certain administrative operations that can only be performed on the owning SP. Therefore, if this is important for the operation being performed the Logic sets Not Owned as a placeholder so that the Logic does not necessarily treat it as an error by itself.

Figure 9:
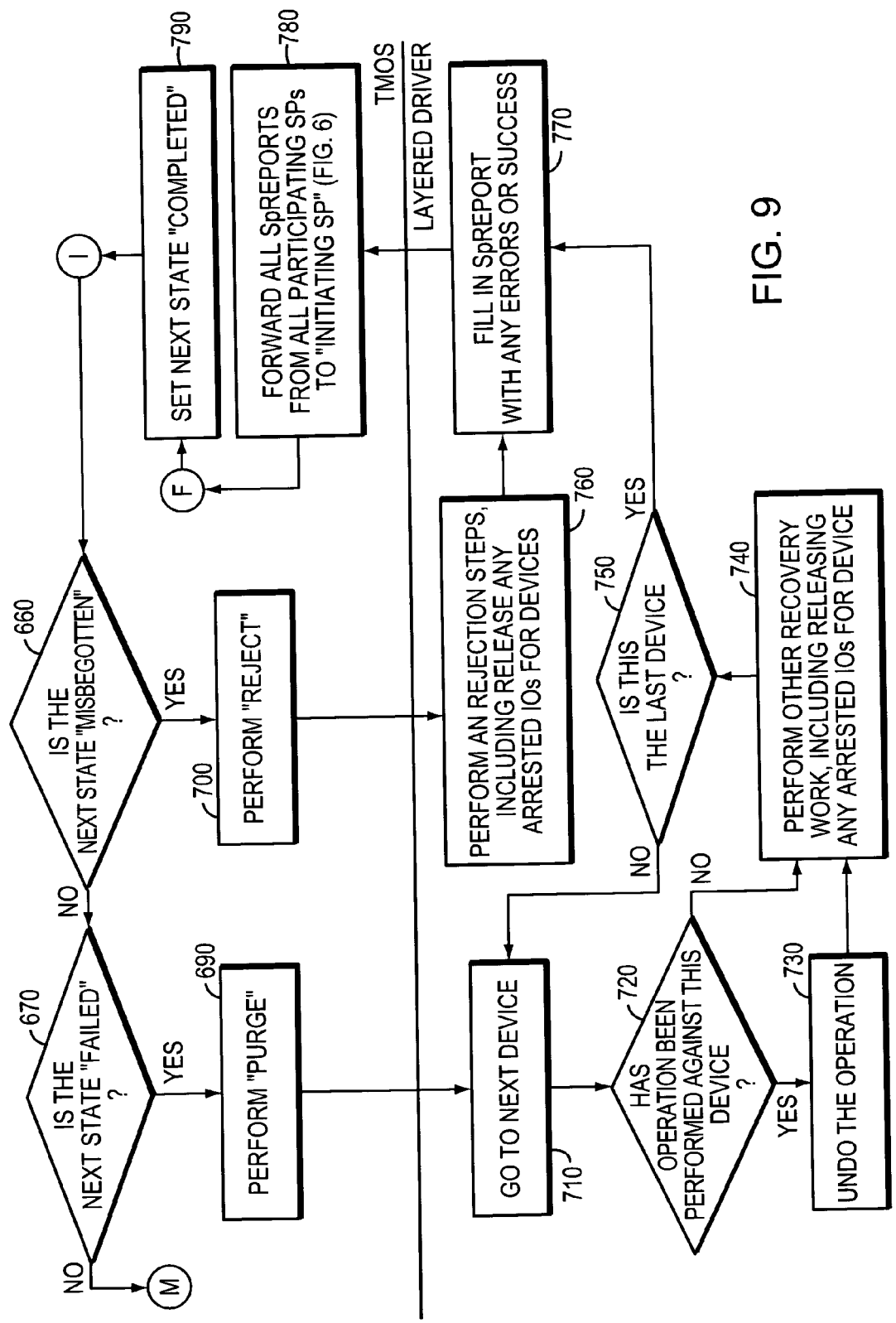
FIG. 9 is another flow logic diagram showing method steps for carrying out a methodology embodiment of the invention enabled by the Program Logic and the architecture of FIG. 1.

Referring to FIG. 9, the steps for the Misbegotten and Failed states are described. The Misbegotten state is the state when the preparation code fails. The Failed state is the state when the perform operation code fails. In Step 660, if the next state is Misbegotten then the Logic initiates the reject code in Step 700. If not, then it continues to Step 670. In Step 700, the Logic performs a reject operation to all of the Participating SPs. In Step 760, the layered driver performs any necessary rejection steps to recover from the failed preparation code. This is necessary for more than one Participating SP. Therefore, on one SP the preparation code may have succeeded, but on another it failed. The recovery includes de-arresting (releasing) IOs that were arrested at FIG. 5 in Step 340.

In Step 770, the Logic compiles the results of doing the rejection or purging. This Step is where the SP running the reject or purge function stores its information (from its point-of-view only) in the SPReport on how its reject or purge function ran.

In Step 670, the next state is Failed so the Logic initiates the purge code in Step 690. If not, then processing flows to connecting Step M and then on to FIG. 10 for the next sets of states to determine. In Step 690, a purge operation is performed for all of the Participating SPs. In Step 710, the cycle of recovery starts for each device.

In Step 720, if the perform operation code has completed on this device, then the Logic proceeds to Step 730 to recover the device back to its previous state before the operation completed. Step 730 is an undo of the operation on the device from this SPs perspective. In Step 740, the Logic performs any other operational cleanup; including de-arresting (releasing) IOs that were arrested at FIG. 5 Step 340.

In Step 750, if the last device is checked, the Logic proceeds to Step 770. In Step 770, the Logic compiles the results of doing the rejection or purging. This Step is where the SP running the reject or purge function stores its information (from its point-of-view only) in the SPReport on how its reject or purge function ran. In Step 780, each TMOS library running on each Participating SP forwards all of the SPReports to the initiating SP. Processing flows back to FIG. 6 to determine if the operation succeeded for this state or not (through continuation Step F). Processing flows back into FIG. 7, and in Step 790, regardless of whether or not the reject or purge code was successful, the next state is Completed, then processing continues to Step I.

Figure 10:
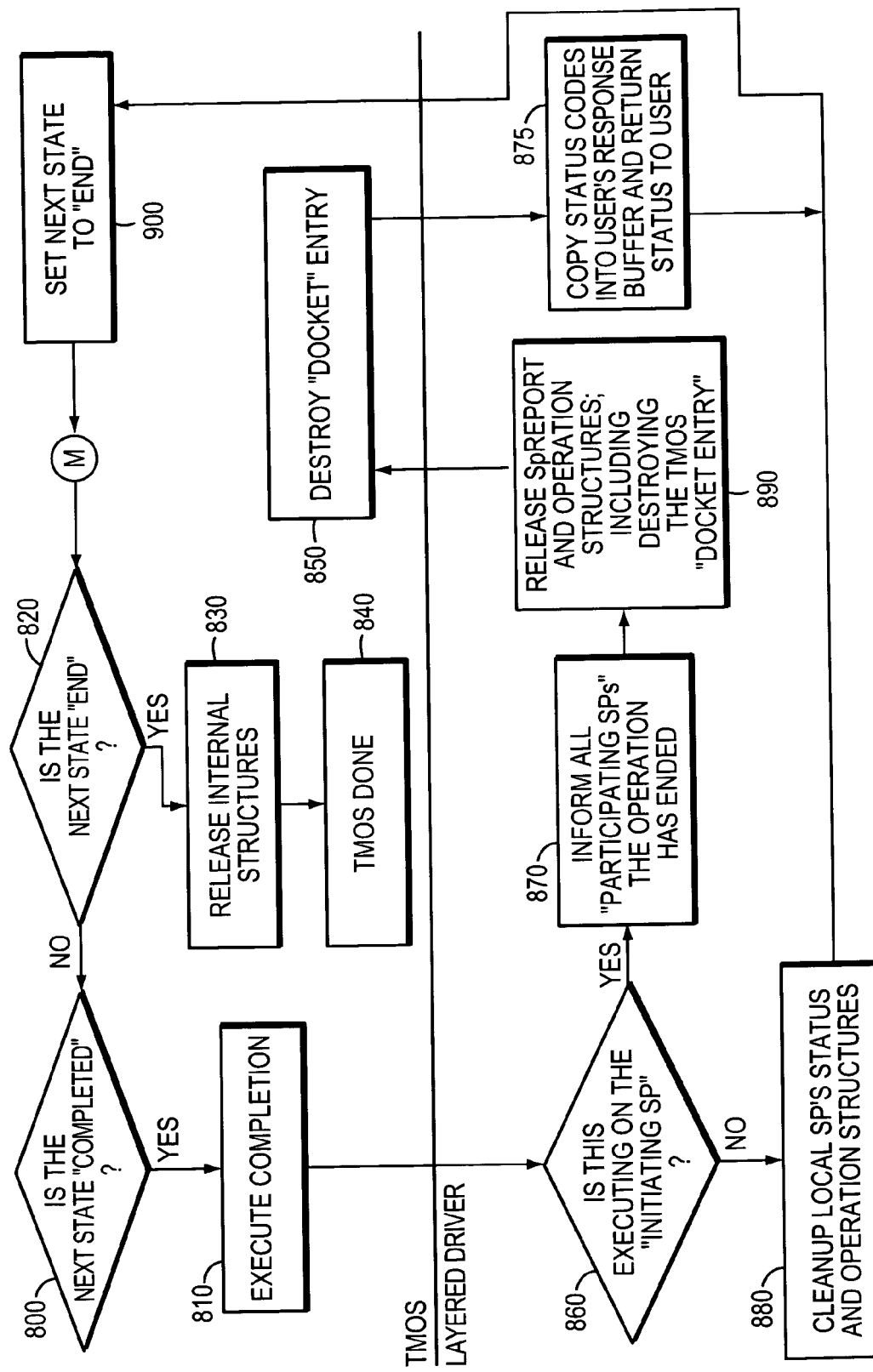
FIG. 10 is another flow logic diagram showing method steps for carrying out a methodology embodiment of the invention enabled by the Program Logic and the architecture of FIG. 1.

Referring to FIG. 10, steps describe the so-called last 2 states for the TMOS library. The Completed state is the state entered after the perform code is successful, the reject code has completed, or the purge code has completed. The End state is always the last state entered after the Completed state has completed. In Step 800, if the next state is Completed then the Logic needs to finish the operation for the layered driver. In Step 810, the Logic begins completing the operation. The Completed state can run on either the initiating SP or on each Participating SP but not both. In Step 860, the Logic checks to see if the SP is executing the completion code on is the initiating SP or not. If it is the Logic proceeds to Step 870. If not, then the Logic proceeds to Step 880, where the Participating SP cleans up the last of its in-memory information and proceeds to Step 900 to enter the End state. (FIGS. 11 and 12 show how the processing works on having the Completed state run on each of the Participating SPs).

In Step 870, since we know we are executing on the Initiating SP, we need to inform all other Participating SPs that the operation has ended. Proceed to Step 890. In Step 890, the Logic releases all of the layered driver in-memory information. In Step 850, since this SP is the original initiating SP the persistent information that was created in FIG. 3 step 170 is destroyed. In Step 875, since the Logic is running on the initiating SP, it needs to fill in the user's status buffer with the status codes from the last unified SPReport generated in FIG. 6 Step 450 or 460. Proceed to Step 900. In Step 900, after the user gets the status of the operation, the layered driver returns to the TMOS library and next state is set to End and proceeds on to Step 820. In Step 820, the End state runs. In Step 830, the internal structures are released to destroy any in-memory non-persistent TMOS library information such as that which was created in FIG. 4 Step 240. In Step 840, the TMOS library exits and waits on the next operation to start.

Figure 11:
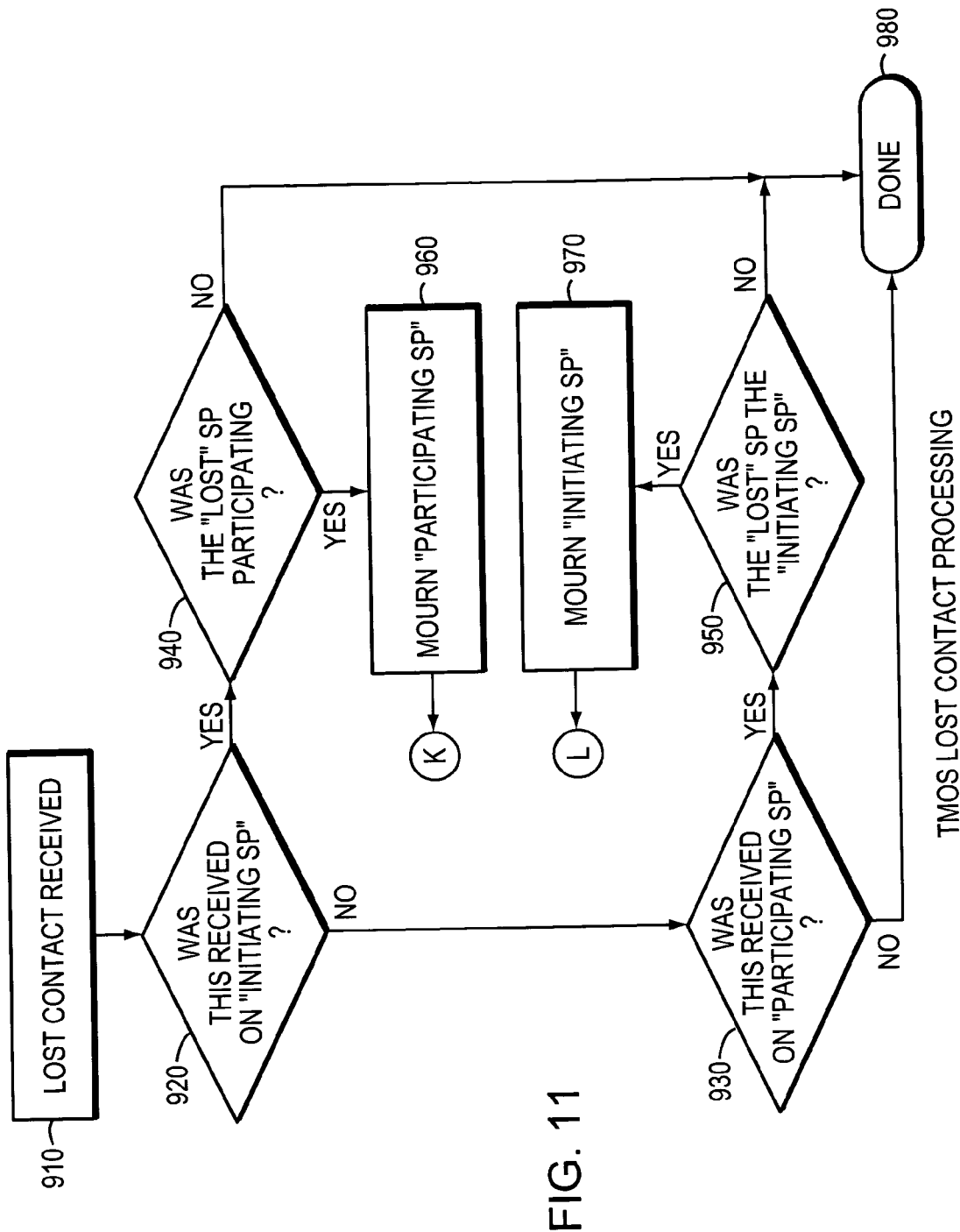
FIG. 11 is another flow logic diagram showing method steps for carrying out a methodology embodiment of the invention enabled by the Program Logic and the architecture of FIG. 1.
Figure 12:
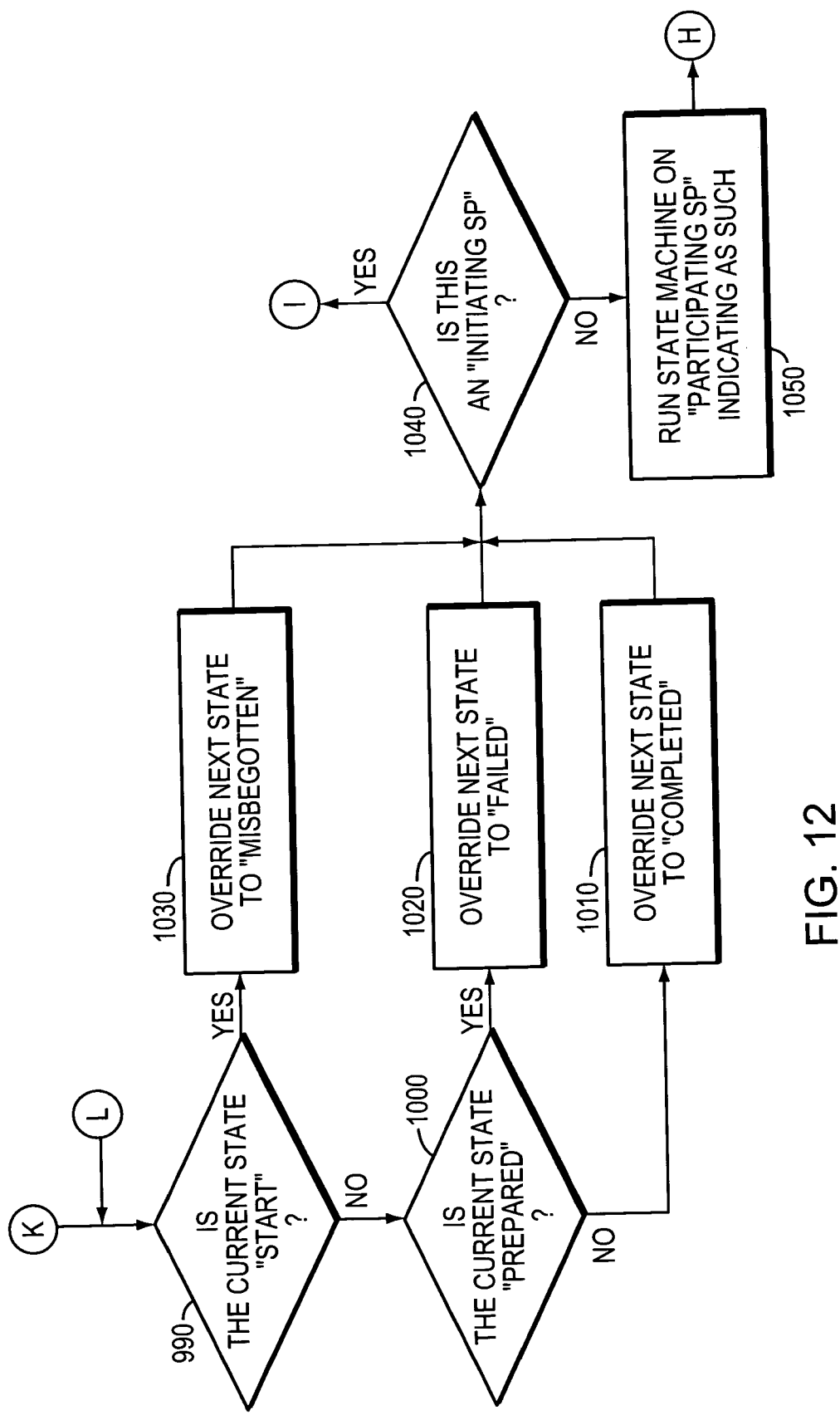
FIG. 12 is another flow logic diagram showing method steps for carrying out a methodology embodiment of the invention enabled by the Program Logic and the architecture of FIG. 1.

Referring to FIG. 11, this generally shows what is called Lost Contact Processing. This is important, because this is the mechanism that is used by the TMOS library to inform all of the Participating SPs that another Participating SP has gone away and it has lost contact with it. In Step 910, an asynchronous lost contact event is received by the TMOS library from the MPS library. All SPs that can communicate locally and on the SAN get notifications when SPs they could once see are no longer responsive. Therefore, it is important to discern whether or not a particular lost contact message requires a response or not. In Step 920, a query is posed to determine if this lost contact is being received on an Initiating SP. If not, then proceed to Step 930. If so, then the Logic proceeds to Step 940.

In Step 930, a query is posed to determine if this lost contact is being received on a Participating SP. If not, then processing is done. If the Logic is not actively running a TMOS state machine then there is nothing to recover from. In Step 940, since it has been determined that an Initiating SP is being used at this step, another query asks whether or not the lost contact event is for a Participating SP for operations for which this Initiating SP is the controller for operations in progress. If not, then processing is done in Step 980. But if the lost contact event is for a Participating SP then the Logic performs what is known as a mourn Participating SP operation in Step 960 and processing flows to continuation Step K and on to FIG. 12.

Referring again to FIG. 11, in Step 950, since it has been determined that this SP is a Participating SP in some operation, a check for the lost contact event is made for another Participating SP or the Initiating SP. If the lost contact event is for the Initiating SP that is the controller of the operation in which this SP is participating in, then the Logic performs what is known as a Mourn Initiating SP operation in Step 970. If not, then the Logic proceeds to Step 980 and is done. Step 960 is where the Mourn Participating SP steps are performed. Step 970 is where the Mourn Initiating SP steps are performed. Step 980 is the step when there is nothing to mourn.

In general there is not an operation to Mourn Participating SPs from other Participating SPs since one of 2 things will occur: (i) the Initiating SP, that is the controller for the operation, also receives the lost contact event and performs the Mourn Participating SP code; (ii) the Initiating SP itself is also down. But if this occurs, each Participating SP will receive a lost contact event for the Initiating SP and the Logic will perform a Mourn Initiating SP operation on each of the Participating SPs.

Referring to FIG. 12, this shows how the Mourn Participating SP and Mourn Initiating SP react to the news of a lost comrade. Each reacts the same way until Step 1050, where the reactions diverge. Step 990 asks if the current state is Started. If not, then the Logic proceeds to Step 1000 and checks to see if the current state is Prepared. If so, then the Logic has not finished or is currently running the preparation code. If in the Started state, then the SP that is being mourned would not have finished this state before the lost contact event. Therefore, the Logic proceeds to Step 1030. Returning back to Step 1000 a query asks if the current state Prepared and if it is not, then the Logic proceeds to Step 1010. If the current state is not Prepared or Started then it must be either Completed, Misbegotten, Failed, or End. If it is any of these, then the Logic overrides the state with Completed and proceeds to Step 1040. But, if in this Prepared state, the SP that is being mourned could not have finished this state before the Logic received the lost contact event, and therefore it proceeds to Step 1020. This is the step where the next state is set to Failed.

Step 1030 is where the next state is set to Misbegotten. Step 1040 asks if this is running on the initiating SP. If this is the Initiating SP and it is mourning one of its Participating SPs, then it run the TMOS state machine and the new state via connection I. If mourning the Initiating SP each Participating SP has to run the TMOS state machine locally assuming the role as his own Initiating SP. This is accomplished at Step 1050. If mourning a Participating SP, then the Logic starts the state machine in the new state. At this point, only the Participating SP is mourning their Initiating SP or the Initiating SP is mourning a Participating SP. Participating SPs do not mourn each other. (See description for FIG. 11, Step 950). Step 1050 is where the Participating SP runs the TMOS state machine at the new determined state running as an assumed Initiating SP with only himself as a Participating SP via connection H.

Figure 13:
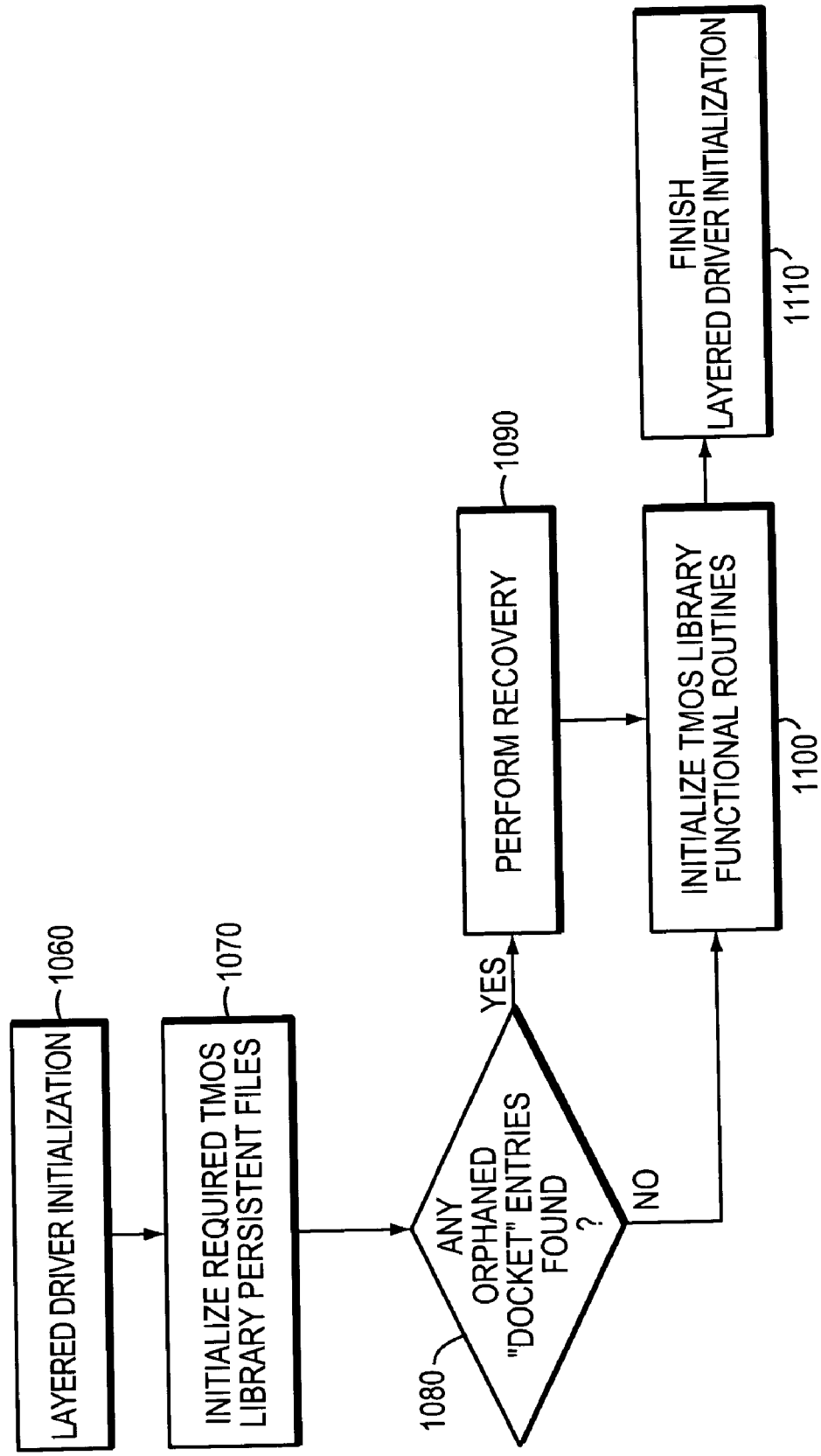
FIG. 13 is another flow logic diagram showing method steps for carrying out a methodology embodiment of the invention enabled by the Program Logic and the architecture of FIG. 1.

Referring to FIG. 13, this shows the TMOS initialization that is needed at boot time as the well as any cleanup/recovery/restarting that might be necessary if the layered driver's boot code discovers records from an operation that was in progress. In Step 1060, the layered driver's initialization (boot and/or load) code is running. In Step 1070, the Logic initializes any persistent file storage needed by this layered driver to use the TMOS library if not initialized previously. In Step 1080, the layered driver searches for any docket entries that belong to it. Only the initiating SP is allowed to destroy or recover the persistent docket information. So if persistent docket information is found during boot/load, then it must be recovered since finding it was unexpected. If any docket entries are found in PSM, proceed to Step 1090 and perform recovery. If not, then proceed to Step 1100. Step 1090 is the step where the layered driver will perform any necessary recovery. This includes, but is not limited to, at least destroying the persistent docket information. Step 1100 initializes the functional interface to TMOS for this boot. This defines the function vectors for the various states the TMOS must execute against the layered driver. In Step 1110 layered driver initialization is done.

An architecture and apparatus has been described for atomic operations over multiple data storage volumes. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. An architecture for atomic replication operations across a plurality of data storage volumes in a data storage environment including one or more data storage systems including the plurality of data storage volumes, the architecture comprising:

at least one storage processor that is part of a data storage system, each storage processor capable of receiving host input/output (I/O) requests, wherein each data storage volume of the plurality of data storage volumes is managed by the at least one storage processor, the storage processor including program logic having a software driver and a library including reporting and operational data structures, the program logic configured for carrying out the following computer executable steps:

in response to receiving an I/O request for a replication operation for a data storage volume managed by the at least one storage processor on a data storage system, determining if the operation will affect more than one volume in the data storage environment; and if the operation will affect more than one volume then initializing the library that is used by the software driver to complete atomic operations for each volume affected by the replication operation.

2. The architecture of claim 1, wherein the library stores arguments for the replication operation.

3. The architecture of claim 2, wherein the library stores states of the replication operation.

4. The architecture of claim 3, wherein the states are stored persistently.

5. The architecture of claim 2, wherein the arguments are stored persistently.

6. The architecture of claim 1, wherein the library stores arguments and states for the replication operation.

7. The architecture of claim 6, wherein the arguments and states of the replication operation are stored persistently.

8. The architecture of claim 7, wherein if the atomic operation fails the driver uses the persistently stored states and arguments to clean up after the failed operation.

9. The architecture of claim 8, wherein following the clean up replication operations are undone by the driver.

10. The architecture of claim 9, where the library may be used over multiple steps involved in the replication operation.

11. An apparatus for atomic replication operations across a plurality of data storage volumes in a data storage environment including one or more data storage systems including the plurality of data storage volumes, the apparatus comprising
at least one storage processor that is part of a data storage system and the storage processor being for managing each data storage volume of the plurality of data storage volumes and wherein each storage processor is capable of receiving host input/output (I/O) requests, the processor including:
means for determining if the operation will affect more than one volume in the data storage environment in response to receiving an I/O request for a replication operation for a data storage volume managed by a storage processor on a data storage system; and
means for initializing a library including reporting and operational data structures that is used by a software driver on the storage processor to complete atomic operations for each volume affected by the replication operation if the operation will affect more than one volume.

12. The apparatus of claim 11, including means for storing arguments from the library for the replication operation.

13. The apparatus of claim 12, including means for storing states from the library for the replication operation.

14. The apparatus of claim 13, including means for storing the states persistently.

15. The apparatus of claim 12, including means for storing the arguments persistently.

16. The apparatus of claim 11, including means for storing arguments and states for the replication operation from the library.

17. The apparatus of claim 16, including means for storing the arguments and states of the replication operation persistently.

18. The apparatus of claim 17, wherein if the atomic operation fails the driver uses the persistently stored states and arguments to clean up after the failed operation.

19. The apparatus of claim 18, wherein following the clean up replication operations are undone by the driver.

20. The apparatus of claim 19, where the library may be used over multiple steps involved in the replication operation.

21. An apparatus for atomic replication operations across a plurality of data storage volumes in a data storage environment including one or more data storage systems including the plurality of data storage volumes, each data storage volume of the plurality of data storage volumes being managed by program logic that is part of the apparatus and is capable of receiving host input/output (I/O) requests, and the program logic is configured for carrying out the following steps:
in response to receiving an I/O request for a replication operation for a data storage volume managed by a storage processor on a data storage system, determining if the operation will affect more than one volume in the data storage environment; and
if the operation will affect more than one volume then initializing a library including reporting and operational data structures that is used by a software driver on the storage processor to complete atomic operations for each volume affected by the replication operation, and wherein the library stores arguments and states for the replication operation persistently and if the atomic operation fails the driver uses the persistently stored states and arguments to clean up after the failed operation, and following the clean up replication operations are undone by the driver.

* * * * *